United States Patent
Lin et al.

(10) Patent No.: US 12,476,417 B2
(45) Date of Patent: Nov. 18, 2025

(54) LIQUID COOLING SYSTEM FOR A CHARGING GUN AND CHARGING GUN

(71) Applicant: Luxshare Precision Industry (Jiangsu)Co., Ltd., Jiangsu (CN)

(72) Inventors: Peiquan Lin, Liyang (CN); Xiangfeng Shen, Liyang (CN); Xingran Tang, Liyang (CN); Yunbo Linghu, Liyang (CN)

(73) Assignee: LUXSHARE PRECISION INDUSTRY (JIANGSU) CO., LTD., Jiangsu (CN)

( * ) Notice: Subject to any disclaimer, the term of this patent is extended or adjusted under 35 U.S.C. 154(b) by 558 days.

(21) Appl. No.: 17/990,440

(22) Filed: Nov. 18, 2022

(65) Prior Publication Data

US 2023/0163520 A1  May 25, 2023

(30) Foreign Application Priority Data

Nov. 19, 2021 (CN) .......................... 202111402044.3

(51) Int. Cl.
*H01R 13/533* (2006.01)
*B60L 53/16* (2019.01)

(52) U.S. Cl.
CPC ............ *H01R 13/533* (2013.01); *B60L 53/16* (2019.02); *H01R 2201/26* (2013.01)

(58) Field of Classification Search
CPC ... H01R 13/533; H01R 2201/26; B60L 53/16; B60L 53/18; B60L 53/302; Y02T 10/70; Y02T 10/7072; Y02T 90/12; Y02T 90/14
(Continued)

(56) References Cited

U.S. PATENT DOCUMENTS 5,684,380 A * 11/1997 Woody .................... B60L 53/34
                                                                320/108
10,902,977 B2    1/2021 Cantz et al.
(Continued)

FOREIGN PATENT DOCUMENTS

CN         107887731 A     4/2018
CN         108461952 A     8/2018
(Continued)

OTHER PUBLICATIONS

Chinese Office Action and Search Report for Chinese Application No. 202111402044.3, dated Apr. 17, 2024, with English translation.

*Primary Examiner* — M Baye Diao

(57) ABSTRACT

Provided is a liquid cooling system for a charging gun and a charging gun, relating to the technical field of charging guns. In the liquid cooling system for a charging gun, a head cooling assembly includes a head housing, a first head seal assembly, a second head seal assembly, and a third head seal assembly. The head housing is provided with a terminal port and a head inlet. The terminal passes through the terminal port and the connection end of the terminal is accommodated in the head housing. The head inlet is configured to enable a cable extend into the head housing to connect to the connection end of the terminal. The first head seal assembly is sealingly disposed at a joint between the connection end of the terminal and the cable. The second head seal assembly is sealingly disposed at the terminal port.

20 Claims, 6 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 10,950,974 | B2* | 3/2021 | Schreiber | ................ H01R 13/72 |
| 11,203,264 | B2* | 12/2021 | Nagel | ....................... H05B 3/18 |
| 12,232,296 | B2* | 2/2025 | Lin | ........................ H01R 13/005 |
| 2022/0055490 | A1* | 2/2022 | Mathews | ............. H01R 13/453 |
| 2022/0410743 | A1* | 12/2022 | Choi | ......................... B60L 53/18 |

FOREIGN PATENT DOCUMENTS

| | | | |
|---|---|---|---|
| CN | 110165459 A | 8/2019 | |
| CN | 209921090 U | 1/2020 | |
| CN | 211075560 U | 7/2020 | |
| CN | 108806851 B | 1/2021 | |
| CN | 213109037 U | 5/2021 | |
| CN | 113660830 A | 11/2021 | |
| CN | 216507941 U | 5/2022 | |
| DE | 20 2019 005 522 U1 | 12/2020 | |
| EP | 3766726 A1 * | 1/2021 | ............ H02J 7/0042 |
| EP | 3768546 B1 * | 3/2023 | ............ B60L 53/18 |
| TW | M571327 U | 12/2018 | |
| WO | WO-2019239262 A1 * | 12/2019 | ............... B60L 53/14 |

* cited by examiner

LIQUID COOLING SYSTEM FOR A CHARGING GUN AND CHARGING GUN

TECHNICAL FIELD

The present utility model relates to the technical field of charging guns and, in particular, to a liquid cooling system for a charging gun and a charging gun.

BACKGROUND

With the popularization of new energy electric vehicles, the development of fast charging technology becomes more and more important. A charging gun is an important component in the fast charging technology, and many mature charging gun products have emerged on the market. To improve the charging speed, shorten the charging time and improve the user experience, the charging current and the power that the charging gun use to charge a load are certainly greater and greater.

During the charging process of an electric vehicle, the charging current is between 500 A to 600 A, and a large amount of heat is generated at the joint between a cable and a terminal and at the joint between the cable and an external power source. This heat decreases the charging efficiency, and the excessive temperature causes a relatively large damage to the charging gun, and even causes a fire.

SUMMARY

An object of the present utility model is to provide a liquid cooling system for a charging gun and a charging gun so as to reduce the temperature at the joint between a cable and a charging terminal.

To achieve the above object, the present utility model provides the technical solution described below.

In one aspect, the present utility model provides a liquid cooling system for a charging gun. The liquid cooling system for a charging gun includes a head cooling assembly, a coolant inlet pipe, and a coolant outlet assembly.

The head cooling assembly includes a head housing, a first head seal assembly, a second head seal assembly, and a third head seal assembly. The head housing is provided with a terminal port and a head inlet. The terminal port and the head inlet are disposed at two ends of the head housing and communicate with the inside of the head housing. The terminal port is configured for a terminal to penetrate and to be disposed on the terminal port, the head housing is configured to accommodate a connection end of the terminal, and the head inlet is configured to enable a cable to extend into the head housing to connect to the connection end of the terminal. The first head seal assembly is disposed in the head housing and sealingly disposed at a joint between the connection end of the terminal and the cable, the second head seal assembly is sealingly disposed at the terminal port, and the third head seal assembly is sealingly disposed at the head inlet.

An outlet end of the coolant inlet pipe extends from the head inlet into the head housing.

An inlet end of the coolant outlet assembly extends from the head inlet into the head housing and communicates with the outlet end of the coolant inlet pipe.

As a preferred embodiment of the liquid cooling system for a charging gun, the first head seal assembly includes a head enclosing member, a head connection member, and a first head seal ring. The head enclosing member is configured to wrap the joint between the connection end of the terminal and the cable. One end of the head connection member is connected to the end of the head enclosing member away from the terminal, and the first head seal ring is disposed between the head connection member and the cable and disposed at the end of the head enclosing member away from the terminal. The head enclosing member, the head connection member, and the first head seal ring form a head seal chamber surrounding the outer side of the cable.

In a preferred embodiment of the liquid cooling system for a charging gun, the second head seal assembly includes a second head seal ring. The periphery of the end of the head enclosing member away from the cable is provided with an annular groove. The annular groove and an inner sidewall of the terminal port enclose to form an annular seal chamber, and the second head seal ring is disposed in the annular seal chamber.

In a preferred embodiment of the liquid cooling system for a charging gun, the coolant inlet pipe is configured to enable the cable to penetrate the coolant inlet pipe and enable the cable to extend into the first head seal assembly to connect to the connection end of the terminal. The end of the head connection member away from the head enclosing member is connected to the outlet end of the coolant inlet pipe, and the outlet end of the coolant inlet pipe extends from the head inlet, through the third head seal assembly and into the head connection member.

In a preferred embodiment of the liquid cooling system for a charging gun, the head connection member includes a liquid outlet hole. The liquid outlet hole is disposed between the outlet end of the coolant inlet pipe and the first head seal ring, and the head seal chamber communicates with the inside of the head housing through the liquid outlet hole.

In a preferred embodiment of the liquid cooling system for a charging gun, the head connection member is a tubular structure, the head connection member comprises a plurality of liquid outlet holes, and the plurality of liquid outlet holes are annularly disposed at the head connection member.

In a preferred embodiment of the liquid cooling system for a charging gun, the head enclosing member includes a first threaded portion, and the head connection member includes a second threaded portion, a first neck portion, and a first stopper portion. The first threaded portion is connected to the second threaded portion. The first neck portion is disposed between the second threaded portion and the first stopper portion. The first head seal ring is sandwiched between the first stopper portion and the head enclosing member. An outer peripheral surface of the first head seal ring is configured to contact the first neck portion, and an inner peripheral surface of the first head seal ring is configured to contact the cable.

In a preferred embodiment of the liquid cooling system for a charging gun, the coolant outlet assembly includes a coolant outlet pipe and a water outlet pipe, and the third head seal assembly includes a head support plate, a head waterproof member, and a head cover. The head support plate is fixed in the head housing, the head cover is disposed at the head inlet, and the head waterproof member is sandwiched between the head cover and the head support plate. The head support plate is provided with a support inlet port and a support outlet port. The head waterproof member is provided with a waterproof inlet port and a waterproof outlet port. The head cover is provided with a head cover inlet port and an avoidance port. The outlet end of the coolant inlet pipe sequentially passes through the head cover inlet port, the waterproof inlet port, and the support inlet port. One end of the water outlet pipe communicates with the outlet end of the coolant inlet pipe, and another end of the water outlet pipe sequentially passes through the support outlet port, the waterproof outlet port and the avoidance port and then is connected to the coolant outlet pipe.

In a preferred embodiment of the liquid cooling system for a charging gun, the third head seal assembly further includes a ballast plate. The ballast plate is provided with a plate inlet port and a plate outlet port, and the ballast plate is disposed between the head cover and the head waterproof member. The coolant inlet pipe passes through the plate inlet port, and the water outlet pipe passes through the plate outlet port.

In a preferred embodiment of the liquid cooling system for a charging gun, a tail cooling assembly is further included. The tail cooling assembly includes a tail housing, a first tail seal assembly, a second tail seal assembly, and a third tail seal assembly. The tail housing is provided with a tail inlet, a tail outlet, and a liquid inlet. An inlet end of the coolant inlet pipe passes through the tail outlet and disposed in the tail housing. The tail inlet is configured for an external connection member to pass through and part of the external connection member is disposed in the tail housing. The tail housing is configured to accommodate another end of the cable away from the head cooling assembly and enable the cable to connect to the external connection member. The first tail seal assembly is sealingly disposed at a joint between the cable and the external connection member. The second tail seal assembly is sealingly disposed at the tail outlet. The third tail seal assembly is sealingly disposed at the tail inlet. The liquid inlet is configured to allow a coolant to enter the tail housing.

In a preferred embodiment of the liquid cooling system for a charging gun, the first tail seal assembly includes a tail enclosing member, a tail connection member, and a first tail seal ring. The tail enclosing member is configured to wrap the joint between the cable and the external connection member. One end of the tail connection member is connected to the end of the tail enclosing member away from the external connection member. The first tail seal ring is disposed between the tail connection member and the cable and disposed at the end of the tail enclosing member away from the external connection member. The tail enclosing member, the tail connection member, and the first tail seal ring form a tail seal chamber surrounding the outer side of the cable.

In a preferred embodiment of the liquid cooling system for a charging gun, the coolant inlet pipe is configured to enable the cable to penetrate the coolant inlet pipe and to enable the cable to extend into the first tail seal assembly to connect to the external connection member. The end of the tail connection member away from the tail enclosing member is connected to the inlet end of the coolant inlet pipe, and the inlet end of the coolant inlet pipe extends from the tail outlet, through the second tail seal assembly and into the tail connection member.

In a preferred embodiment of the liquid cooling system for a charging gun, the tail connection member includes a liquid inlet hole. The liquid inlet hole is disposed between the inlet end of the coolant inlet pipe and the first tail seal ring, and the tail seal chamber communicates with the inside of the tail housing through the liquid inlet hole.

In a preferred embodiment of the liquid cooling system for a charging gun, the tail connection member is a tubular structure, the tail connection member comprises a plurality of liquid inlet holes, and the plurality of liquid inlet holes are annularly disposed in the tail connection member.

In a preferred embodiment of the liquid cooling system for a charging gun, the tail enclosing member includes a third threaded portion, and the tail connection member includes a fourth threaded portion, a second neck portion, and a second stopper portion. The third threaded portion is connected to the fourth threaded portion. The second neck portion is disposed between the fourth threaded portion and the second stopper portion. The first tail seal ring is sandwiched between the second stopper portion and the tail enclosing member. An outer peripheral surface of the first tail seal ring is configured to contact the second neck portion, and an inner peripheral surface of the first tail seal ring is configured to contact the cable.

In a preferred embodiment of the liquid cooling system for a charging gun, the second tail seal assembly includes a first tail support plate, a first tail waterproof member, and a first tail cover. The first tail support plate is fixed in the tail housing. The first tail cover is disposed at the tail outlet. The first tail waterproof member is sandwiched between the first tail support plate and the first tail cover. The first tail support plate is provided with a support outlet, the first tail waterproof member is provided with a waterproof outlet, and the first tail cover is provided with a tail cover outlet. The coolant inlet pipe sequentially passes through the support outlet, the waterproof outlet and the tail cover outlet from inside to outside.

In a preferred embodiment of the liquid cooling system for a charging gun, the third tail seal assembly includes a second tail support plate, a second tail waterproof member, and a second tail cover. The second tail support plate is fixed in the tail housing. The second tail cover is disposed at the tail inlet. The second tail waterproof member is sandwiched between the second tail support plate and the second tail cover. The second tail support plate is provided with a support inlet, the second tail waterproof member is provided with a waterproof inlet, and the second tail cover is provided with a tail cover inlet. The tail enclosing member sequentially passes through the support inlet, the waterproof inlet and the tail cover inlet from inside to outside.

In another aspect, the present utility model provides a charging gun including the liquid cooling system for a charging gun, the terminal and the cable in any one of the above solutions. The terminal penetrates the terminal port, the connection end of the terminal is accommodated in the head housing, the cable extends through the head inlet into the head housing, and the first head seal assembly is sealingly disposed at the joint between the connection end of the terminal and the cable.

The present utility model has beneficial effects described below.

The present utility model provides a liquid cooling system for a charging gun. The liquid cooling system for a charging gun includes a head cooling assembly, a coolant inlet pipe, and a coolant outlet assembly. The head cooling assembly includes a head housing, a first head seal assembly, a second head seal assembly, and a third head seal assembly. The head housing is provided with a terminal port and a head inlet. The terminal port and the head inlet are disposed at two ends of the head housing and communicate with the inside of the head housing. The terminal port is configured for a terminal to penetrate and to be disposed on the terminal port, the head housing is configured to accommodate a connection end of the terminal, and the head inlet is configured to enable a cable to extend into the head housing and connect to the connection end of the terminal. The first head seal assembly is disposed in the head housing and sealingly disposed at a joint between the connection end of the terminal and the cable, the second head seal assembly is sealingly disposed at the terminal port, and the third head seal assembly is sealingly disposed at the head inlet. An outlet end of the coolant inlet pipe extends from the head inlet into the head housing. An inlet end of the coolant outlet assembly extends from the head inlet into the head housing and communicates with the outlet end of the coolant inlet pipe. In the present utility model, the above arrangement enables the inflow and outflow of the coolant in the head housing to continuously carry away the heat generated at the joint between the cable and the terminal, thereby reducing the temperature at the joint between the cable and the terminal, improving the charging efficiency, and reducing a risk in charging.

Figure 1:
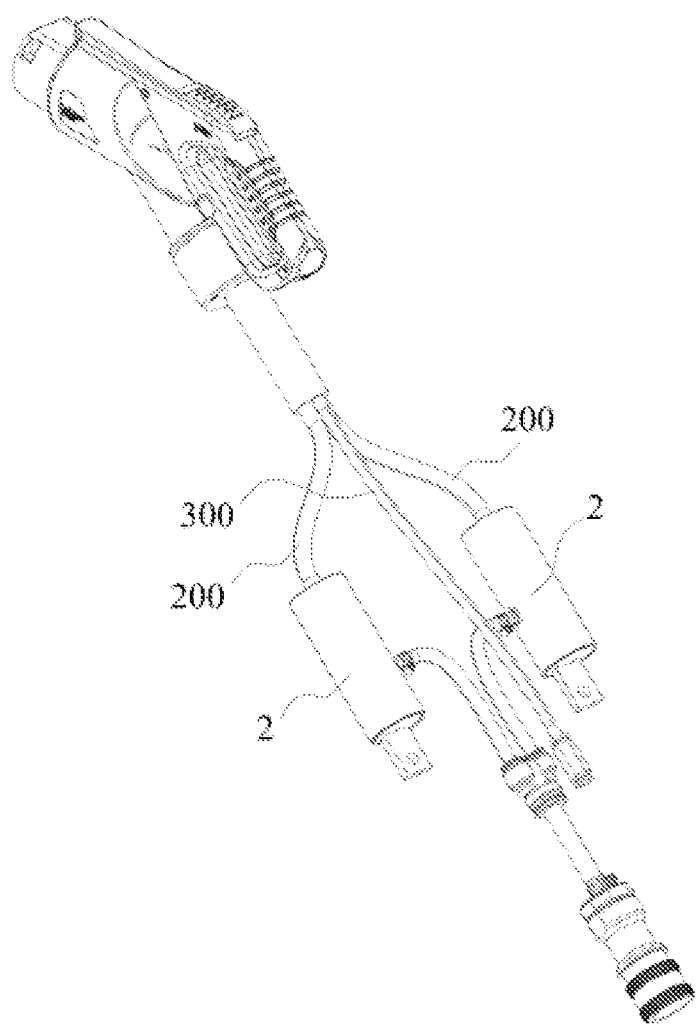
FIG. 1 is a view illustrating the structure of a charging gun according to an embodiment of the present utility model.

REFERENCE LIST 100 cable
200 coolant inlet pipe
300 coolant outlet assembly
301 coolant outlet pipe
302 water outlet pipe
400 three-way pipe
1 head cooling assembly
11 head housing
111 terminal port
112 head inlet
113 flow guiding member
12 first head seal assembly
121 head enclosing member
1211 first threaded portion
122 head connection member
1221 liquid outlet hole
1222 second threaded portion
1223 first neck portion
1224 first stopper portion
123 first head seal ring
13 second head seal assembly
14 third head seal assembly
141 head support plate
142 head waterproof member
143 head cover
144 ballast plate
15 terminal
2 tail cooling assembly
21 tail housing
211 tail inlet
212 tail outlet
213 liquid inlet
214 raised strip
22 first tail seal assembly
221 tail enclosing member
2211 third threaded portion
222 tail connection member
2221 liquid inlet hole
2222 fourth threaded portion
2223 second neck
2224 second stopper portion
223 first tail seal ring
23 second tail seal assembly
231 first tail support plate
232 first tail waterproof member
233 first tail cover
234 first sealant
24 third tail seal assembly
241 second tail support plate
242 second tail waterproof member
243 second tail cover
244 second sealant
25 external connection member

DETAILED DESCRIPTION

Technical solutions of the present utility model are clearly and completely described below in conjunction with the drawings. Apparently, embodiments described herein are part, not all, of the embodiments of the present utility model. Based on the embodiments of the present utility mode, all other embodiments obtained by those of ordinary skill in the art are within the scope of the present utility mode on the premise that no creative work is done.

In the description of the present utility model, it should be noted that the orientations or position relations indicated by terms such as "center", "above", "below", "left", "right", "vertical", "horizontal", "inside", "outside", and the like are based on orientations or position relations shown in the drawings. These orientations or position relations are intended only to facilitate and simplify description of the present utility model and not to indicate or imply that a device or element referred to must have such specific orientations or must be configured or operated in such specific orientations. Thus, these orientations or position relations are not to be construed as limiting the present utility model. Moreover, terms such as "first" and "second" are used merely for the purpose of description and are not to be construed as indicating or implying relative importance. Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the present utility model, it is to be noted that, unless otherwise expressly specified and limited, the term "mounting", "connected to each other", or "connected" is to be construed in a broad sense, for example, as securely connected, detachably connected, or integrally connected; mechanically connected or electrically connected; directly connected to each other or indirectly connected to each other via an intermediary; or internally connected between two elements. For those of ordinary skill in the art, specific meanings of the preceding terms in the present utility model may be understood based on specific situations.

The embodiments of the present utility model are described below in detail. Examples of the embodiments are shown in the drawings. The same or similar reference numerals indicate the same or similar elements or components having the same or similar functions. The embodiments described below with reference to the drawings are exemplary, merely used to explain the present utility model, and not to be construed as limiting the present utility model.

Embodiment One

Figure 2:
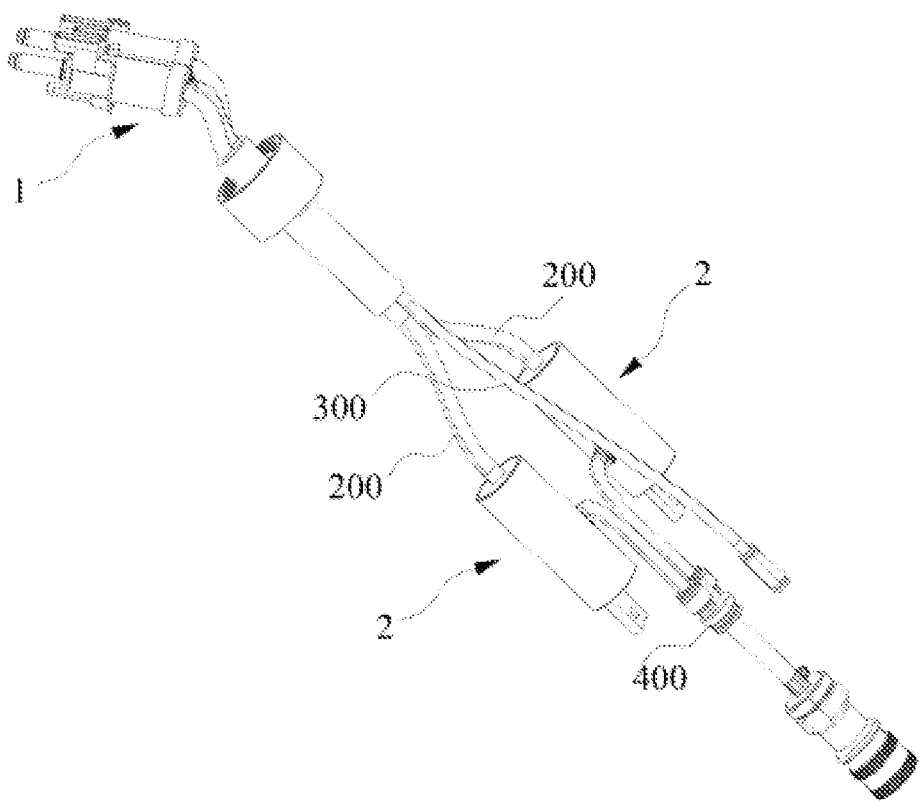
FIG. 2 is a view illustrating the structure of a liquid cooling system for a charging gun according to an embodiment of the present utility model.
Figure 3:
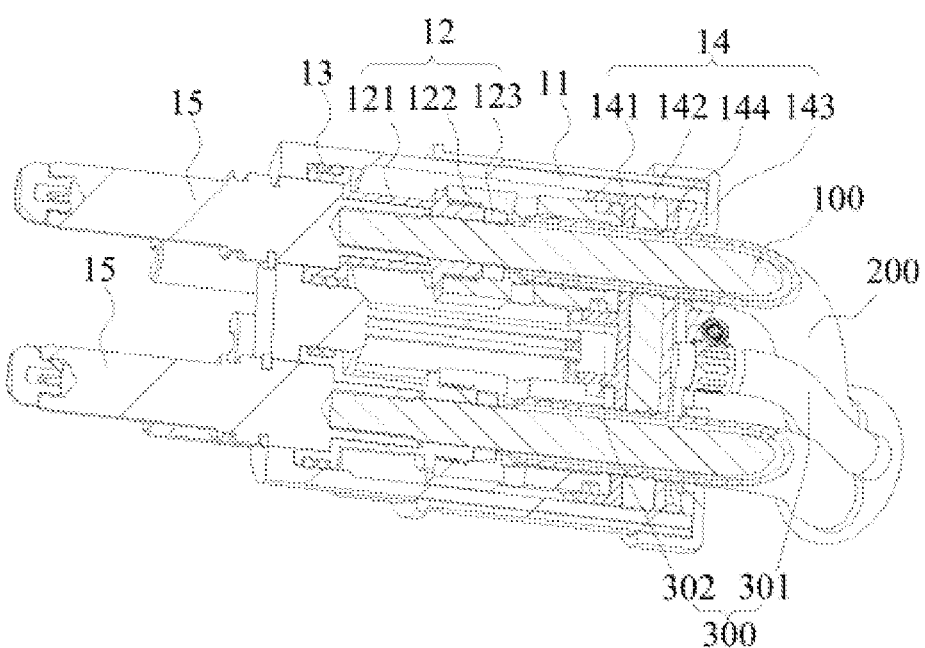
FIG. 3 is a view illustrating the structure of a head cooling assembly according to an embodiment of the present utility model.
Figure 6:
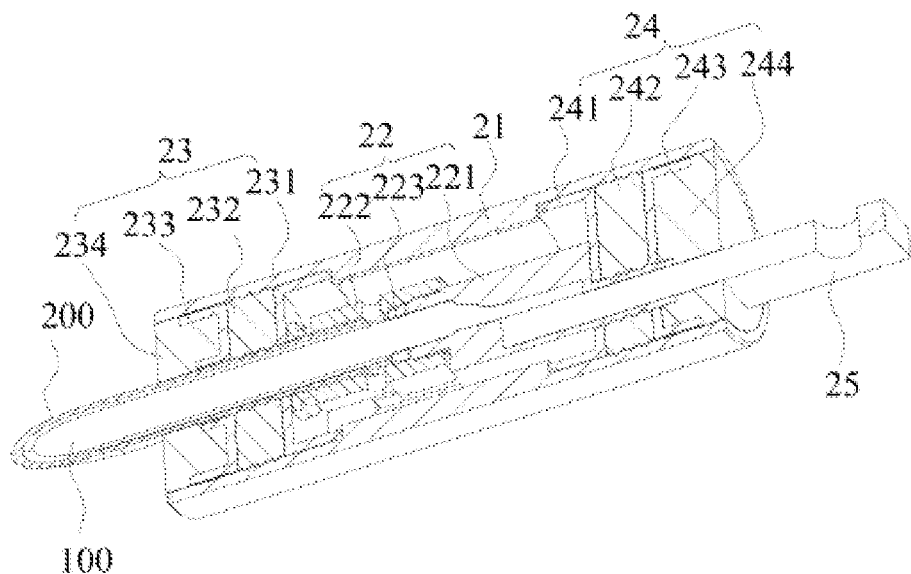
FIG. 6 is a view illustrating the structure of a tail cooling assembly according to embodiments of the present utility model.

As shown in FIGS. 2, 3 and 6, this embodiment provides a liquid cooling system for a charging gun. The liquid cooling system for a charging gun includes a head cooling assembly 1, a coolant inlet pipe 200, and a coolant outlet assembly 300. The head cooling assembly 1 includes a head housing 11, a first head seal assembly 12, a second head seal assembly 13, and a third head seal assembly 14. The head housing 11 is provided with a terminal port 111 and a head inlet 112. The terminal port 111 and the head inlet 112 are disposed at two ends of the head housing 11 and communicate with the inside of the head housing 11. The terminal port 111 is configured for a terminal 15 to penetrate and to be disposed on the terminal port 111, the head housing 11 is configured to accommodate a connection end of the terminal 15, and the head inlet 112 is configured to enable a cable 100 to extend into the head housing 11 to connect to the connection end of the terminal 15. The first head seal assembly 12 is disposed in the head housing 11 and sealingly disposed at a joint between the connection end of the terminal 15 and the cable 100, the second head seal assembly 13 is sealingly disposed at the terminal port 111, and the third head seal assembly 14 is sealingly disposed at the head inlet 112. An outlet end of the coolant inlet pipe 200 extends from the head inlet 112 into the head housing 11. An inlet end of the coolant outlet assembly 300 extends from the head inlet 112 into the head housing 11 and communicates with the outlet end of the coolant inlet pipe 200.

Optionally, in this embodiment, two terminals 15 are provided for the positive output of a current and the negative output of the current, respectively. In some embodiments, the liquid cooling system of the charging gun is suitable for a direct-current charging gun, and the terminal 15 is a DC terminal, that is, a terminal for transmitting a DC current, where DC is an abbreviation of direct current.

In this embodiment, the arrangement of the above structure allows the coolant to continuously flow into the head housing 11 through the coolant inlet pipe 200 and flow out through the coolant outlet assembly 300. The coolant circulates through the head housing 11 to carry away the heat generated at the joint between the cable 100 and the terminal 15, thereby reducing the temperature at the joint between the cable 100 and the terminal 15, improving the charging efficiency, and reducing a risk in charging.

Preferably, the first head seal assembly 12 includes a head enclosing member 121, a head connection member 122, and a first head seal ring 123. The head enclosing member 121 is configured to wrap the joint between the connection end of the terminal 15 and the cable 100. One end of the head connection member 122 is connected to the end of the head enclosing member 121 away from the terminal 15, and the first head seal ring 123 is disposed between the head connection member 122 and the cable 100 and disposed at the end of the head enclosing member 121 away from the terminal 15. The head enclosing member 121, the head connection member 122, and the first head seal ring 123 form a head seal chamber surrounding the outer side of the cable 100. With the arrangement of the above structure, the coolant does not enter the joint between the connection end of the terminal 15 and the cable 100 along the gap between the head enclosing member 121 and the cable 100, thereby ensuring the sealing effect between the connection end of the terminal 15 and the cable 100. In some embodiment, the head enclosing member is an over-molding member. In some embodiment, the head enclosing member is over-molded by plastic.

With respect to the structure of the second head seal assembly 13 in this embodiment, optionally, the second head seal assembly 13 includes a second head seal ring. The periphery of the end of the head enclosing member 121 away from the cable 100 is provided with an annular groove. The annular groove and the inner sidewall of the terminal port 111 enclose to form an annular seal chamber, and the second head seal ring is disposed in the annular seal chamber. This arrangement can prevent the coolant from flowing out of the head housing 11. In addition, another end of the head enclosing member 121 is disposed at the side of the second head seal ring away from the internal chamber of the head housing 11, so that the coolant is prevented from entering the joint between the connection end of the terminal 15 and the cable 100 along the gap between the another end of the head enclosing member 121 and the cable 100.

Figure 4:
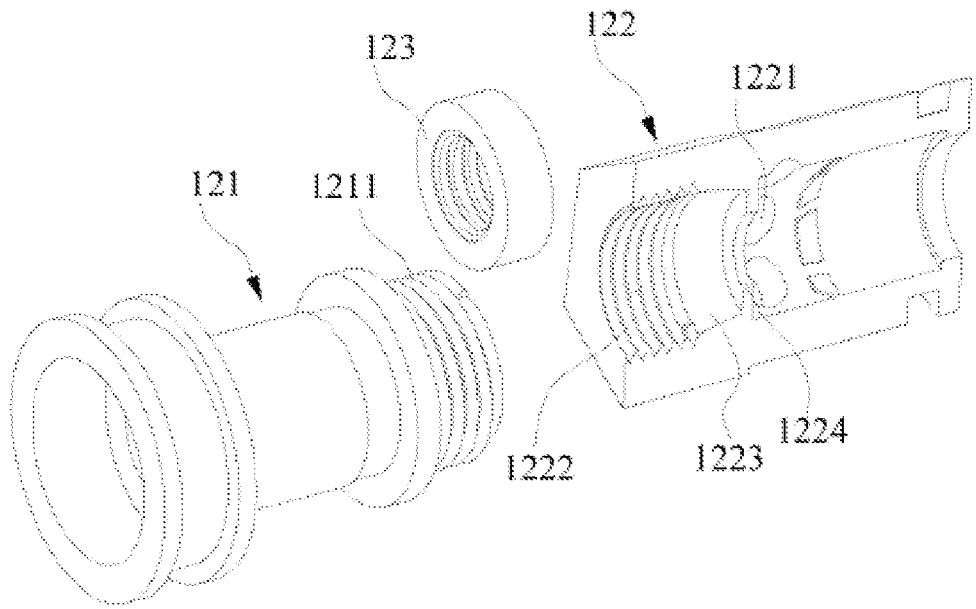
FIG. 4 is a sectional view illustrating the structure of a head enclosing member, a first head seal ring and a head connection member according to an embodiment of the present utility model.
Figure 5:
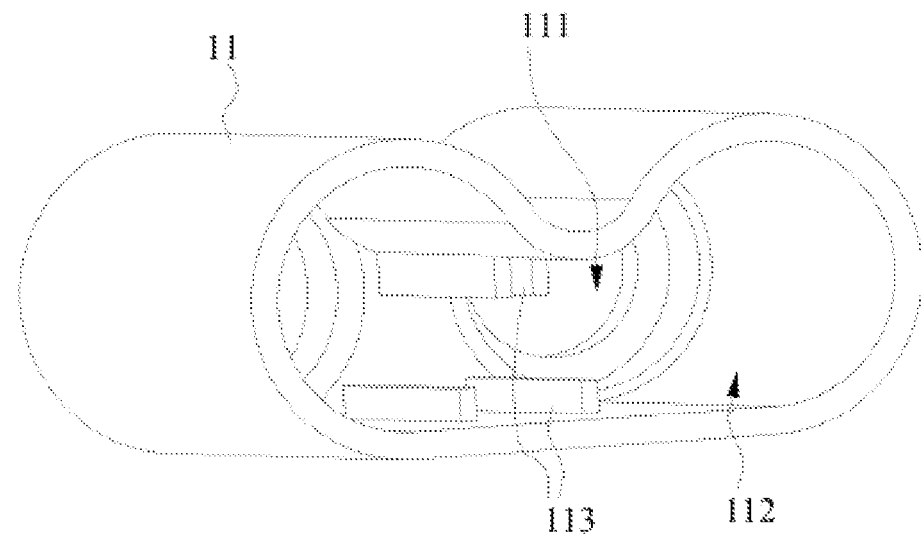
FIG. 5 is a view illustrating the structure of a head housing according to embodiments of the present utility model.

With reference to FIG. 3 and FIG. 4, preferably, the cable 100 penetrate the coolant inlet pipe 200. This arrangement can cool down the entire cable 100, further reducing a risk in charging. In addition, the above arrangement also avoids providing a separate sealing member between the cable 100 and the head housing 11, thereby further reducing the cost.

Specifically, the coolant inlet pipe 200 is configured to enable the cable 100 to penetrate the coolant inlet pipe 200 and enable the cable 100 to extend into the first head seal assembly 12 to connect to the connection end of the terminal 15. The end of the head connection member 122 away from the head enclosing member 121 is connected to the outlet end of the coolant inlet pipe 200, and the outlet end of the coolant inlet pipe 200 extends from the head inlet 112, through the third head seal assembly 14 and into the head connection member 122. This arrangement enables the heat of the cable 100 to be carried away as the coolant flows, thereby lowering the temperature of the entire cable 100. In addition, the above arrangement ensures that the coolant inlet pipe 200 and the head connection member 122 are relatively fixed, thereby ensuring that the coolant inlet pipe 200 and the terminal 15 are relatively fixed, so that the position of the cable 100 in the coolant inlet pipe 200 is relatively fixed and in a relatively central position, thereby ensuring that the coolant can flow out of the coolant inlet pipe 200 uniformly.

Preferably, the head connection member 122 includes a liquid outlet hole 1221. The liquid outlet hole 1221 is disposed between the outlet end of the coolant inlet pipe 200 and the first head seal ring 123, and the head seal chamber communicates with the head housing 11 through the liquid outlet hole 1221. The arrangement of the above structure enables the coolant to enter the head housing 11 from the coolant inlet pipe 200 so as to cool the terminal 15 disposed in the head housing 11.

Further, the head connection member 122 is a tubular structure, the head connection member 122 includes a plurality of liquid outlet holes 1221, and the plurality of liquid outlet holes 1221 are annularly disposed in the head connection member 122. The plurality of liquid outlet holes 1221 are provided so that the outflow of the coolant is relatively smooth, and the flow of the coolant is prevented from being affected after one of the liquid outlet holes 1221 is blocked. Since the outlet end of the coolant inlet pipe 200 communicates with the head seal chamber, the structure in which the plurality of liquid outlet holes 1221 are annularly disposed in the head connection member 122 allows the coolant to flow out more uniformly, and thus the terminal 15 disposed in the head housing 11 can be fully cooled.

Specifically, the head enclosing member 121 includes a first threaded portion 1211, and the head connection member 122 includes a second threaded portion 1222, a first neck portion 1223, and a first stopper portion 1224. The first threaded portion 1211 is connected to the second threaded portion 1222. The first neck portion 1223 is disposed between the second threaded portion 1222 and the first stopper portion 1224. The first head seal ring 123 is sandwiched between the first stopper portion 1224 and the head enclosing member 121. The outer peripheral surface of the first head seal ring 123 is configured to contact the first neck portion 1223, and the inner peripheral surface of the first head seal ring 123 is configured to contact the cable 100. The arrangement of the above structure can achieve the connection between the head connection member 122 and the head enclosing member 121 and the fixing of the first head seal ring 123. In other implementations of this embodiment, the connection between the head connection member 122 and the head enclosing member 121 may also be clamping.

Figure 7:
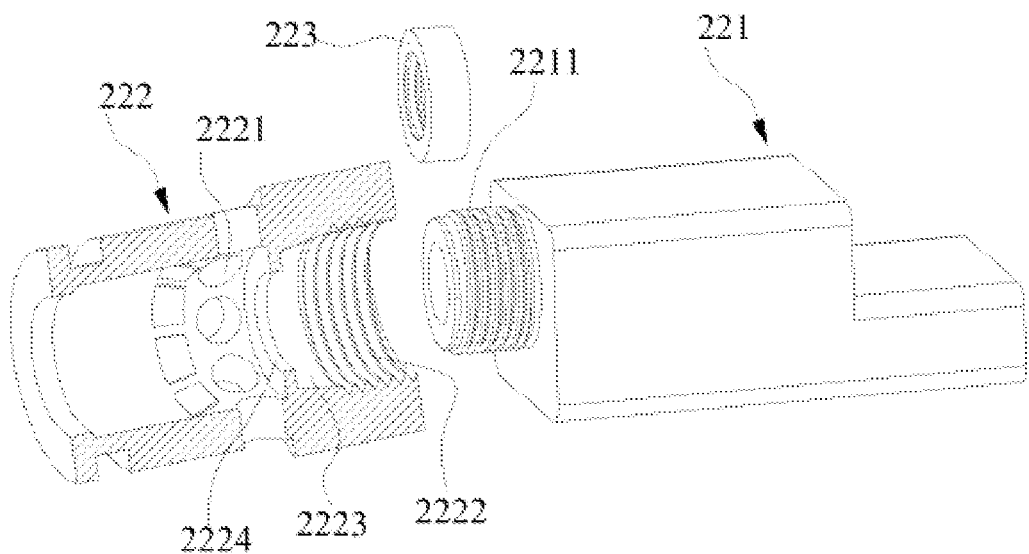
FIG. 7 is a sectional view illustrating the structure of a tail enclosing member, a first tail seal ring, and a tail connection member according to embodiments of the present utility model.

With reference to FIG. 6 and FIG. 7, preferably, the coolant outlet assembly 300 includes a coolant outlet pipe 301 and a water outlet pipe 302, and the third head seal assembly 14 includes a head support plate 141, a head waterproof member 142, and a head cover 143. The head support plate 141 is fixed in the head housing 11, the head cover 143 is disposed at the head inlet 112, and the head waterproof member 142 is sandwiched between the head cover 143 and the head support plate 141. The head support plate 141 is provided with a support inlet port and a support outlet port. The head waterproof member 142 is provided with a waterproof inlet port and a waterproof outlet port. The head cover 143 is provided with a head cover inlet port and an avoidance port. The outlet end of the coolant inlet pipe 200 sequentially passes through the head cover inlet port, the waterproof inlet port and the support inlet port. One end of the water outlet pipe 302 communicates with the outlet end of the coolant inlet pipe 200, and another end of the water outlet pipe 302 sequentially passes through the support outlet port, the waterproof outlet port and the avoidance port and then is connected to the coolant outlet pipe 301. With the arrangement of the above structure, the head inlet 112 can be sealed. Optionally, the water outlet pipe 302 and the head support plate 141 are sealingly connected or integrally formed. Preferably, a flow guiding member 113 is disposed in the head housing 11. The flow guiding member 113 is disposed between the inlet of the water outlet pipe 302 and the outlet end of the coolant inlet pipe 200 and extends along the direction of the outlet end of the coolant inlet pipe 200. Further, in this embodiment, two flow guiding members 113 are provided. The arrangement of the two flow guiding members 113 makes the communication chamber between the inlet end of the coolant outlet assembly 300 and the outlet end of the coolant inlet pipe 200 narrow, so that the coolant needs to enter the water outlet pipe 302 through a relatively narrow chamber after flowing out from the outlet end of the coolant inlet pipe 200. Therefore, the flow distance of the coolant in the head housing 11 is further enlarged, and the coolant flow directly from the outlet end of the coolant inlet pipe 200 to the water outlet pipe 302 is prevented, thereby improving the cooling effect.

In this embodiment, with respect to the structure of the flow guiding member 113, specifically, the flow guiding member 113 may include a flow guiding bar. The flow guiding bar is disposed on the inner wall of the head housing 11 and disposed parallel to the extending direction of the terminal 15. This arrangement, on the one hand, can narrow the communication chamber between the inlet end of the coolant outlet assembly 300 and the outlet end of the coolant inlet pipe 200, thereby increasing the flow path of the coolant. On the other hand, the head housing 11 can also be reinforced, increasing the strength of the head housing 11.

In this embodiment, optionally, the plurality of liquid outlet holes 1221 are disposed obliquely, and the center line of the liquid outlet hole 1221 is oblique from the inside of the head connection member 122 to the outside of the head connection member 122 and toward the joint between the connection end of the terminal 15 and the cable 100. The inclined liquid outlet hole 1221 is provided so that the coolant can move toward the joint between the connection end of the terminal 15 and the cable 100 after the coolant is ejected from the liquid outlet hole 1221, thereby more effectively cooling the joint between the connection end of the terminal 15 and the cable 100. In this embodiment, since the inlet end of the coolant outlet assembly 300 extends into the head housing 11 from the head inlet 112, so that the flow path of the coolant is further increased, and the cooling capacity of the coolant at the same flow rate is improved.

With reference to FIG. 3, in this embodiment, preferably, the head support plate 141 abuts against the end of the head connection member 122 facing the coolant inlet pipe 200, the inner sidewall of the terminal port 111 is provided with a raised strip, and the end of the head enclosing member 121 away from the coolant inlet pipe 200 abuts against the raised strip. This arrangement allows the head connection member 122 and the head enclosing member 121 to be relatively fixed, thereby ensuring the head support plate 141 to be relatively fixed with respect to the head housing 11. Moreover, this arrangement allows the space of the internal chamber of the head housing 11 to be as large as possible, increases the amount of coolant that can be accommodated, and improves the speed of heat transfer.

Preferably, the third head seal assembly 14 further includes a ballast plate 144. The ballast plate 144 is provided with a plate inlet port and a plate outlet port. Moreover, the ballast plate 144 is disposed between the head cover 143 and the head waterproof member 142. The coolant inlet pipe 200 passes through the plate inlet port, and the water outlet pipe 302 passes through the plate outlet port. In this embodiment, optionally, the head waterproof member 142 may be a silicone pad. In this embodiment, this arrangement enables the ballast plate 144 to compress the head waterproof member 142 and also prevent radial deformation of the head waterproof member 142. In addition, the head cover 143 only needs to complete the connection with the head housing 11 and the function of pressing against the ballast plate 144, thereby reducing the processing difficulty of the head cover 143 and further reducing the production cost.

Figure 8:
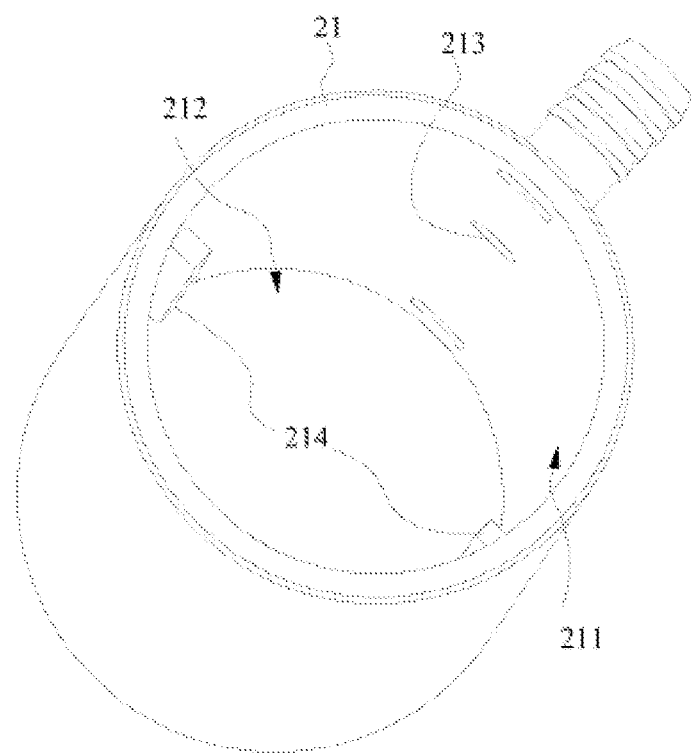
FIG. 8 is a view illustrating the structure of a tail housing according to embodiments of the present utility model.

With reference to FIGS. 6 to 8, in this embodiment, preferably, the liquid cooling system for a charging gun further includes a tail cooling assembly 2. The tail cooling assembly 2 includes a tail housing 21, a first tail seal assembly 22, a second tail seal assembly 23, and a third tail seal assembly 24. The tail housing 21 is provided with a tail inlet 211, a tail outlet 212, and a liquid inlet 213. An inlet end of the coolant inlet pipe 200 passes through the tail outlet 212 into the tail housing 21. The tail inlet 211 is configured for an external connection member 25 to pass through such that part of the external connection member 25 is disposed in the tail housing 21. The tail housing 21 is configured to accommodate another end of the cable 100 away from the head cooling assembly 1 and to enable the cable 100 to connect to the external connection member 25. The first tail seal assembly 22 is sealingly disposed at a joint between the cable 100 and the external connection member 25. The second tail seal assembly 23 is sealingly disposed at the tail outlet 212. The third tail seal assembly 24 is sealingly disposed at the tail inlet 211. The liquid inlet 213 is configured to allow a coolant to enter the tail housing 21. With the arrangement of the tail cooling assembly 2, the heat generated at the joint between the cable 100 and the external connection member 25 is carried away by the coolant, thereby lowering the temperature at the joint and reducing a risk in charging.

Further, the connection end between the cable 100 and the external connection member 25 is provided with a copper sheet, the external connection member 25 is a copper busbar, and ultrasonic welding is preferably performed between the copper sheet and the copper busbar. In other implementations of this embodiment, the cable 100 may be distributed and welded on the copper busbar.

Optionally, two tail cooling assemblies are provided for cooling the joint between the positive cable 100 and the external connection member 25 and the joint between the negative cable 100 and the external connection member 25, respectively. Moreover, liquid inlets 213 of the two tail cooling assemblies are merged into a main pipe through a sub-pipe and a three-way pipe 400. This arrangement reduces the pipe arrangement, saves the cost, and facilitates the transfer of the charging gun.

With respect to the first tail seal assembly 22, in this embodiment, optionally, the first tail seal assembly 22 includes a tail enclosing member 221, a tail connection member 222, and a first tail seal ring 223. The tail enclosing member 221 is configured to wrap the joint between the cable 100 and the external connection member 25. One end of the tail connection member 222 is connected to the end of the tail enclosing member 221 away from the external connection member 25. The first tail seal ring 223 is disposed between the tail connection member 222 and the cable 100 and disposed at the end of the tail enclosing member 221 away from the external connection member 25. The tail enclosing member 221, the tail connection member 222, and the first tail seal ring 223 form a tail seal chamber surrounding the outer side of the cable 100. With the above arrangement, the coolant can be prevented from entering the joint between the cable 100 and the external connection member 25 from the gap between the tail enclosing member 221 and the cable 100, thereby playing a waterproof role. In some embodiment, the tail enclosing member is an overmolding member. In some embodiment, the tail enclosing member is over-molded by plastic.

Optionally, the coolant inlet pipe 200 is configured to enable the cable 100 to penetrate the coolant inlet pipe 200 and enable the cable 100 to extend into the first tail seal assembly 22 to connect to the external connection member 25. The end of the tail connection member 222 away from the tail enclosing member 221 is connected to the inlet end of the coolant inlet pipe 200, and the inlet end of the coolant inlet pipe 200 extends from the tail outlet 212, through the second tail seal assembly 23 and into the tail connection member 222. This arrangement allows the heat of the cable 100 to be carried away as the coolant flows, thereby lowering the temperature of the entire cable 100. In addition, the above arrangement ensures that the coolant inlet pipe 200 and the tail connection member 222 are relatively fixed, thereby ensuring that the coolant inlet pipe 200 and the external connection member 25 are relatively fixed, so that the position of the cable 100 in the coolant inlet pipe 200 is relatively fixed and in a relatively central position, thereby ensuring that the coolant can flow into the coolant inlet pipe 200 uniformly. In the second aspect, the cable 100 is more reliably connected to the external connection member 25.

Optionally, the tail connection member 222 includes a liquid inlet hole 2221. The liquid inlet hole 2221 is disposed between the inlet end of the coolant inlet pipe 200 and the first tail seal ring 223, and the tail seal chamber communicates with the inside of the tail housing 21 through the liquid inlet hole 2221. The arrangement of the above structure enables the coolant to enter the coolant inlet pipe 200 from the head housing 11 so as to flow into the head housing 11.

Further, the tail connection member 222 is a tubular structure, the tail connection member 222 includes a plurality of liquid inlet holes 2221, and the plurality of liquid inlet holes 2221 are annularly disposed in the tail connection member 222. The plurality of liquid inlet holes 2221 are provided so that the inflow of the coolant is relatively smooth, and the flow of the coolant is prevented from being affected after one of the liquid inlet holes 2221 is blocked. Since the tail seal chamber communicates with the inlet end of the coolant inlet pipe 200, the structure in which the plurality of liquid inlet holes 2221 are annularly disposed in the tail connection member 222 allows the coolant to flow in more uniformly, and thus the cable 100 disposed in the coolant inlet pipe 200 can be fully cooled.

Specifically, the tail enclosing member 221 includes a third threaded portion 2211, and the tail connection member 222 includes a fourth threaded portion 2222, a second neck portion 2223, and a second stopper portion 2224. The third threaded portion 2211 is connected to the fourth threaded portion 2222. The second neck portion 2223 is disposed between the fourth threaded portion 2222 and the second stopper portion 2224. The first tail seal ring 223 is sandwiched between the second stopper portion 2224 and the tail enclosing member 221. An outer peripheral surface of the first tail seal ring 223 is configured to contact the second neck portion 2223, and an inner peripheral surface of the first tail seal ring 223 is configured to contact the cable 100. The arrangement of the above structure enables the connection between the tail connection member 222 and the tail enclosing member 221 and the fixing of the first tail seal ring 223. Optionally, in other implementations of this embodiment, the connection between the tail connection member 222 and the tail enclosing member 221 is clamping.

Preferably, the second tail seal assembly 23 includes a first tail support plate 231, a first tail waterproof member 232, and a first tail cover 233. The first tail support plate 231 is fixed in the tail housing 21. The first tail cover 233 is disposed at the tail outlet 212. The first tail waterproof member 232 is sandwiched between the first tail support plate 231 and the first tail cover 233. The first tail support plate 231 is provided with a support outlet, the first tail waterproof member 232 is provided with a waterproof outlet, and the first tail cover 233 is provided with a tail cover outlet. The coolant inlet pipe 200 sequentially passes through the support outlet, the waterproof outlet and the tail cover outlet from inside to outside. With the above arrangement, sealing of the tail outlet 212 is achieved. Optionally, a first sealant 234 is poured at the tail outlet 212 to seal the gap between the first tail cover 233 and the tail outlet 212 and the gap between the first tail cover 233 and the coolant inlet pipe 200.

In this embodiment, preferably, the third tail seal assembly 24 includes a second tail support plate 241, a second tail waterproof member 242, and a second tail cover 243. The second tail support plate 241 is fixed in the tail housing 21. The second tail cover 243 is disposed at the tail inlet 211. The second tail waterproof member 242 is sandwiched between the second tail support plate 241 and the second tail cover 243. The second tail support plate 241 is provided with a support inlet, the second tail waterproof member 242 is provided with a waterproof inlet, and the second tail cover 243 is provided with a tail cover inlet. The tail enclosing member 221 sequentially passes through the support inlet, the waterproof inlet and the tail cover inlet from inside to outside. With the above arrangement, sealing of the tail inlet 211 is achieved. Optionally, a second sealant 244 is poured at the tail inlet 211 to seal the gap between the second tail cover 243 and the tail inlet 211, the gap between the second tail cover 243 and the tail enclosing member 221, and the gap between the tail enclosing member 221 and the external connection member 25.

Optionally, the inner wall of the tail housing 21 is provided with two raised strips 214 opposite to each other, and two ends of each of the two raised strips 214 abut against and support the first tail support plate 231 and the second tail support plate 241 respectively. This arrangement allows the volume of the internal chamber of the tail housing 21 to be as large as possible, increases the amount of coolant that can be accommodated, and improves the speed of heat transfer.

In this embodiment, preferably, each of the head cooling assembly 1 and the tail cooling assembly 2 includes a liquid leakage detector, and the liquid leakage detector is configured to detect whether a liquid is leaking from the head housing 11 and the tail housing 21.

Embodiment Two

With reference to FIGS. 1 to 3, this embodiment further provides a charging gun including the liquid cooling system for a charging gun, the terminal 15 and the cable 100 in the above solution. The terminal 15 penetrates the terminal port 111, the connection end of the terminal 15 is accommodated in the head housing 11, the cable 100 extends through the head inlet 112 into the head housing 11, and the first head seal assembly 12 is sealingly disposed at the joint between the connection end of the terminal 15 and the cable 100.

Apparently, the preceding embodiments of the present utility model are merely example embodiments for clearly illustrating the present utility model and are not intended to limit the implementations of the present utility model. For those of ordinary skill in the art, changes or alterations in other different forms may also be made based on the preceding description. Implementations of the present disclosure cannot be and do not need to be all exhausted herein. Any modification, equivalent, improvement and the like made within the spirit and principle of the present utility model shall be within the scope of the claims of the present utility model.

What is claimed is:

1. A liquid cooling system for a charging gun, comprising: a head cooling assembly, a coolant inlet pipe, and a coolant outlet assembly;
wherein the head cooling assembly comprises a head housing, a first head seal assembly, a second head seal assembly, and a third head seal assembly, wherein the head housing is provided with a terminal port and a head inlet, the terminal port and the head inlet are disposed at two ends of the head housing and communicate with an inside of the head housing, the terminal port is configured for a terminal to penetrate and be disposed on the terminal port, the head housing is configured to accommodate a connection end of the terminal, the head inlet is configured to enable a cable to extend into the head housing to connect to the connection end of the terminal, the first head seal assembly is disposed in the head housing and sealingly disposed at a joint between the connection end of the terminal and the cable, the second head seal assembly is sealingly disposed at the terminal port, and the third head seal assembly is sealingly disposed at the head inlet;
wherein an outlet end of the coolant inlet pipe extends from the head inlet into the head housing; and
wherein an inlet end of the coolant outlet assembly extends from the head inlet into the head housing and communicates with the outlet end of the coolant inlet pipe.

2. The liquid cooling system for a charging gun according to claim 1, wherein the first head seal assembly comprises a head enclosing member, a head connection member, and a first head seal ring, wherein the head enclosing member is configured to wrap the joint between the connection end of the terminal and the cable, an end of the head connection member is connected to an end of the head enclosing member away from the terminal, and the first head seal ring is disposed between the head connection member and the cable and disposed at the end of the head enclosing member away from the terminal; and the head enclosing member, the head connection member, and the first head seal ring form a head seal chamber surrounding an outer side of the cable.

3. The liquid cooling system for a charging gun according to claim 2, wherein the second head seal assembly comprises a second head seal ring, a periphery of an end of the head enclosing member away from the cable is provided with an annular groove, the annular groove and an inner sidewall of the terminal port enclose to form an annular seal chamber, and the second head seal ring is disposed in the annular seal chamber.

4. The liquid cooling system for a charging gun according to claim 2, wherein the coolant inlet pipe is configured to enable the cable to penetrate and to be disposed at the coolant inlet pipe and enable the cable to extend into the first head seal assembly to connect to the connection end of the terminal, an end of the head connection member away from the head enclosing member is connected to the outlet end of the coolant inlet pipe, and the outlet end of the coolant inlet pipe extends from the head inlet, through the third head seal assembly and into the head connection member.

5. The liquid cooling system for a charging gun according to claim 4, wherein the head connection member comprises a liquid outlet hole, the liquid outlet hole is disposed between the outlet end of the coolant inlet pipe and the first head seal ring, and the head seal chamber communicates with the inside of the head housing through the liquid outlet hole.

6. The liquid cooling system for a charging gun according to claim 5, wherein the head connection member is a tubular structure, the head connection member comprises a plurality of liquid outlet holes, and the plurality of liquid outlet holes are annularly disposed at the head connection member.

7. The liquid cooling system for a charging gun according to claim 5, wherein the head enclosing member comprises a first threaded portion, the head connection member comprises a second threaded portion, a first neck portion, and a first stopper portion, the first threaded portion is connected to the second threaded portion, the first neck portion is disposed between the second threaded portion and the first stopper portion, the first head seal ring is sandwiched between the first stopper portion and the head enclosing member, an outer peripheral surface of the first head seal ring is configured to contact the first neck portion, and an inner peripheral surface of the first head seal ring is configured to contact the cable.

8. The liquid cooling system for a charging gun according to claim 1, wherein the coolant outlet assembly comprises a coolant outlet pipe and a water outlet pipe, the third head seal assembly comprises a head support plate, a head waterproof member, and a head cover, the head support plate is fixed in the head housing, the head cover is disposed at the head inlet, and the head waterproof member is sandwiched between the head cover and the head support plate; the head support plate is provided with a support inlet port and a support outlet port, the head waterproof member is provided with a waterproof inlet port and a waterproof outlet port, and the head cover is provided with a head cover inlet port and an avoidance port; and the outlet end of the coolant inlet pipe sequentially passes through the head cover inlet port, the waterproof inlet port and the support inlet port, an end of the water outlet pipe communicates with the outlet end of the coolant inlet pipe, and an other end of the water outlet pipe sequentially passes through the support outlet port, the waterproof outlet port and the avoidance port and then is connected to the coolant outlet pipe.

9. The liquid cooling system for a charging gun according to claim 8, wherein the third head seal assembly further comprises a ballast plate, the ballast plate is provided with a plate inlet port and a plate outlet port, the ballast plate is disposed between the head cover and the head waterproof member, the coolant inlet pipe passes through the plate inlet port, and the water outlet pipe passes through the plate outlet port.

10. The liquid cooling system for a charging gun according to claim 1, further comprising a tail cooling assembly, wherein the tail cooling assembly comprises a tail housing, a first tail seal assembly, a second tail seal assembly, and a third tail seal assembly; the tail housing is provided with a tail inlet, a tail outlet, and a liquid inlet; an inlet end of the coolant inlet pipe passes through the tail outlet and is disposed in the tail housing; the tail inlet is configured for an external connection member to pass through and part of the external connection member is disposed in the tail housing; the tail housing is configured to accommodate an other end of the cable away from the head cooling assembly and enable the cable to connect to the external connection member; the first tail seal assembly is sealingly disposed at a joint between the cable and the external connection member; the second tail seal assembly is sealingly disposed at the tail outlet; the third tail seal assembly is sealingly disposed at the tail inlet; and the liquid inlet is configured to allow coolant to enter the tail housing.

11. The liquid cooling system for a charging gun according to claim 10, wherein the first tail seal assembly comprises a tail enclosing member, a tail connection member, and a first tail seal ring, wherein the tail enclosing member is configured to wrap the joint between the cable and the external connection member, an end of the tail connection member is connected to an end of the tail enclosing member away from the external connection member, and the first tail seal ring is disposed between the tail connection member and the cable and disposed at the end of the tail enclosing member away from the external connection member; and the tail enclosing member, the tail connection member, and the first tail seal ring form a tail seal chamber surrounding an outer side of the cable.

12. The liquid cooling system for a charging gun according to claim 11, wherein the coolant inlet pipe is configured to enable the cable to penetrate an to be disposed on the coolant inlet pipe and to enable the cable extend into the first tail seal assembly to connect to the external connection member, an end of the tail connection member away from the tail enclosing member is connected to the inlet end of the coolant inlet pipe, and the inlet end of the coolant inlet pipe extends from the tail outlet, through the second tail seal assembly and into the tail connection member.

13. The liquid cooling system for a charging gun according to claim 12, wherein the tail connection member comprises a liquid inlet hole, the liquid inlet hole is disposed between the inlet end of the coolant inlet pipe and the first tail seal ring, and the tail seal chamber communicates with an inside of the tail housing through the liquid inlet hole.

14. The liquid cooling system for a charging gun according to claim 13, wherein the tail connection member is a tubular structure, the tail connection member comprises a plurality of liquid inlet holes and the plurality of liquid inlet holes are annularly disposed at the tail connection member.

15. The liquid cooling system for a charging gun according to claim 13, wherein the tail enclosing member comprises a third threaded portion, the tail connection member comprises a fourth threaded portion, a second neck portion, and a second stopper portion, the third threaded portion is connected to the fourth threaded portion, the second neck portion is disposed between the fourth threaded portion and the second stopper portion, the first tail seal ring is sandwiched between the second stopper portion and the tail enclosing member, an outer peripheral surface of the first tail seal ring is configured to contact the second neck portion, and an inner peripheral surface of the first tail seal ring is configured to contact the cable.

16. The liquid cooling system for a charging gun according to claim 11, wherein the second tail seal assembly comprises a first tail support plate, a first tail waterproof member, and a first tail cover; the first tail support plate is fixed in the tail housing, the first tail cover is disposed at the tail outlet, the first tail waterproof member is sandwiched between the first tail support plate and the first tail cover, the first tail support plate is provided with a support outlet, the first tail waterproof member is provided with a waterproof outlet, and the first tail cover is provided with a tail cover outlet; and the coolant inlet pipe sequentially passes through the support outlet, the waterproof outlet and the tail cover outlet from inside to outside.

17. The liquid cooling system for a charging gun according to claim 11, wherein the third tail seal assembly comprises a second tail support plate, a second tail waterproof member, and a second tail cover; the second tail support plate is fixed in the tail housing, the second tail cover is disposed at the tail inlet, the second tail waterproof member is sandwiched between the second tail support plate and the second tail cover, the second tail support plate is provided with a support inlet, the second tail waterproof member is provided with a waterproof inlet, and the second tail cover is provided with a tail cover inlet; and the tail enclosing member sequentially passes through the support inlet, the waterproof inlet and the tail cover inlet from inside to outside.

18. A charging gun, comprising the liquid cooling system for a charging gun, the terminal and the cable according to claim 1, wherein the terminal penetrates and is disposed on the terminal port, the connection end of the terminal is accommodated in the head housing, the cable extends through the head inlet into the head housing, and the first head seal assembly is sealingly disposed at the joint between the connection end of the terminal and the cable.

19. The charging gun according to claim 18, wherein the first head seal assembly comprises a head enclosing member, a head connection member, and a first head seal ring, wherein the head enclosing member is configured to wrap the joint between the connection end of the terminal and the cable, an end of the head connection member is connected to an end of the head enclosing member away from the terminal, and the first head seal ring is disposed between the head connection member and the cable and disposed at the end of the head enclosing member away from the terminal; and the head enclosing member, the head connection member, and the first head seal ring form a head seal chamber surrounding an outer side of the cable.

20. The charging gun according to claim 19, further comprising a tail cooling assembly, wherein the tail cooling assembly comprises a tail housing, a first tail seal assembly, a second tail seal assembly, and a third tail seal assembly; the tail housing is provided with a tail inlet, a tail outlet, and a liquid inlet; an inlet end of the coolant inlet pipe passes through the tail outlet and disposed in the tail housing; the tail inlet is configured for an external connection member to pass through and part of the external connection member is disposed in the tail housing; the tail housing is configured to accommodate an other end of the cable away from the head cooling assembly and enable the cable to connect to the external connection member; the first tail seal assembly is sealingly disposed at a joint between the cable and the external connection member; the second tail seal assembly is sealingly disposed at the tail outlet; the third tail seal assembly is sealingly disposed at the tail inlet; and the liquid inlet is configured to allow coolant to enter the tail housing.

* * * * *